United States Patent
Bernstein et al.

(10) Patent No.: US 7,210,722 B2
(45) Date of Patent: May 1, 2007

(54) PULL-OUT DESK UNIT FOR MOBILE VEHICLE

(75) Inventors: William M. Bernstein, Pittsburgh, PA (US); Derek Blitz, Portland, OR (US); Andrew Kilb, Carrboro, NC (US); Megan M. Stanton, Long Beach, CA (US); David M. Wynne, Fishkill, NY (US); Deepshikha B. Antes, Columbia, MD (US); Edwin K. Chan, Wilmington, DE (US); Benjamin G. Morris, Falls Church, VA (US); Scott Raven, Atlanta, GA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/338,979

(22) Filed: Jan. 25, 2006

(65) Prior Publication Data

US 2006/0163911 A1    Jul. 27, 2006

Related U.S. Application Data

(60) Provisional application No. 60/646,817, filed on Jan. 25, 2005.

(51) Int. Cl.
*B60P 3/00* (2006.01)

(52) U.S. Cl. .................................. 296/24.3; 296/190.02

(58) Field of Classification Search ................ 296/24.3, 296/190.02, 190.01, 24.22, 24.24
See application file for complete search history.

(56) References Cited

U.S. PATENT DOCUMENTS

| | | | | |
|---|---|---|---|---|
| 2,503,543 | A | * | 4/1950 | Caston ....................... 297/145 |
| 3,391,960 | A | * | 7/1968 | Megargle et al. ........... 296/24.3 |
| 4,263,854 | A | * | 4/1981 | Moore et al. ................. 108/37 |
| 4,508,038 | A | * | 4/1985 | Tulenko, Jr. ................ 108/135 |
| 5,201,379 | A | * | 4/1993 | Penzotti et al. ........ 296/190.02 |
| 5,577,818 | A | * | 11/1996 | Sayre ....................... 312/235.8 |
| 5,829,366 | A | * | 11/1998 | Uono ......................... 108/161 |
| 6,024,427 | A | * | 2/2000 | Underwood et al. ... 312/249.12 |
| 6,270,137 | B1 | * | 8/2001 | Minix et al. ............... 296/24.3 |
| 6,644,724 | B1 | * | 11/2003 | Penaloza et al. ....... 296/190.02 |
| 6,874,597 | B2 | * | 4/2005 | Buchanan et al. ............ 182/96 |
| 7,042,716 | B2 | * | 5/2006 | Shearman ................... 361/684 |

* cited by examiner

*Primary Examiner*—Kiran B. Patel
(74) *Attorney, Agent, or Firm*—Jeffrey P. Calfa; Gerald W. Askew; Susan L. Lukasik

(57) ABSTRACT

A pull-out desk unit for a mobile vehicle. The pull-out desk unit has a cantilevered dual surface table component. The cantilevered dual surface table offers truckers a legless table for eating and general tasks, as well as desk area that keeps their belongings as they leave them eliminating the need to clean up or put things away. The innovation in this product lies in the memory foam lid. Once the table is pulled out, the lid (top surface for eating/general table) can be unlatched and fold back revealing a desk area lower than the surface of the eating/general table. On the under side of the lid is relatively thin low density memory foam. This foam can compress easily inch allowing it to conform to anything left on the table.

3 Claims, 3 Drawing Sheets

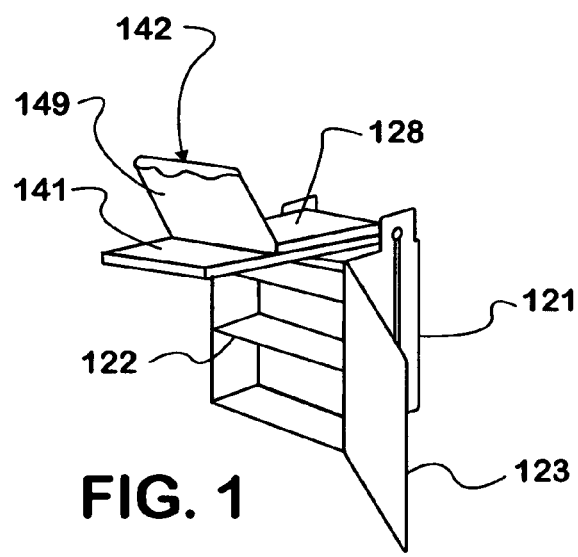
FIG. 1
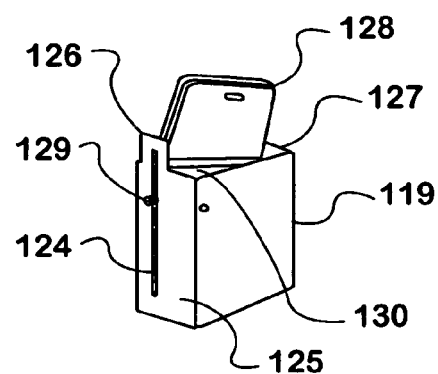
FIG. 2
FIG. 3
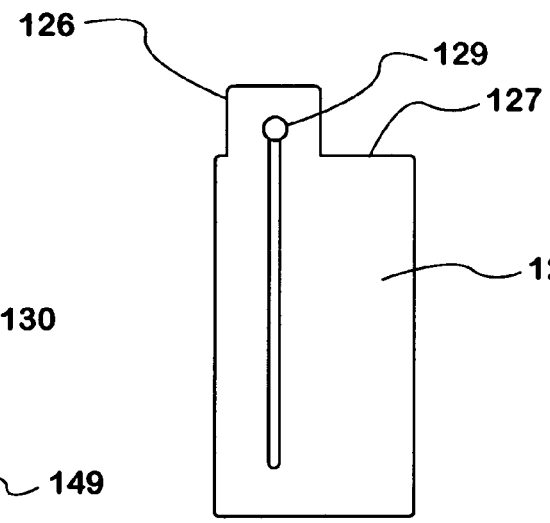
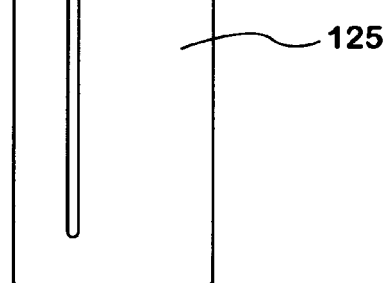
FIG. 5

PULL-OUT DESK UNIT FOR MOBILE VEHICLE

This patent issues from a non-provisional patent application claiming the priority of provisional patent application Ser. Nos. 60/646,817, filed Jan. 25, 2005.

BACKGROUND

Trucks carry a bulk of the goods within the United States. Driver's have a difficult lifestyle in which they spend much of their time within the cab and sleeper of their over the road tractor trailers. They must comply with federal regulations in the United States that limit the amount of time behind the wheel as well as boredom and discomfort living life within the walls of what has been likened to a small mobile studio apartment. For employers that employ over the road drivers, retention has become a challenge. The general method of moving goods with trucks is not likely to change in the foreseeable future. The results of a survey performed by the inventors of this patent show that during their off-hours, truckers spend an average of 3.6 hours in truck awake. Of these hours, they spend about one hour preparing food, nearly an hour socializing with friends inside their trucks, and about 2.5 hours entertaining themselves with television or books. This invention and the project that it sprang from is intended to:

- Create a space that drivers will be proud to show to other drivers,
- Allow for 3–5 truckers to socialize together in the truck comfortably,
- Create a space for food preparation and storage specific to the eating habits of truckers,
- Create a bright and entertaining environment,
- Give drivers a sense of separation between work and leisure,
- Give drivers a way to isolate their sleeping space from their living space, and
- Optimize the limited amount of space in a sleeper for storage.

Drivers need to have horizontal space to both prepare food and desk space to prepare paperwork required for their jobs. The problem of course is that space is limited. The solution of this invention involves dual space in creating an area that can serve as both kitchen preparation and eating space as well as a desk. The challenge is facilitating the transition of the space between the two very different uses.

The invention focuses on providing a pull-out desk unit for a mobile vehicle. The pull-out desk unit provides horizontal food preparation and eating area when the desk stowed. The unit allows the driver to "freeze" the office related items on the desk while the pull-out desk is in a stowed condition. When the driver returns and pulls out the pull-out desk for paperwork and other office activities, he is able to find the office related items exactly as he left them upon stowage.

SUMMARY

This invention relates to a pull-out desk unit for a mobile vehicle. The pull-out desk unit has a cantilevered dual surface table component. The cantilevered dual surface table offers truckers a legless table for eating and general tasks, as well as desk area that keeps their belongings as they leave them eliminating the need to clean up or put things away. The innovation in this product lies in the memory foam lid. Once the table is pulled out, the lid (top surface for eating/ general table) can be unlatched and fold back revealing a desk area lower than the surface of the eating/general table. On the under side of the lid is relatively thin low density memory foam. This foam can compress easily inch allowing it to conform to anything left on the table. Clerical supplies, small laptops, PDA's and other items can be left on the desk surface and when the memory foam lid is latched closed, it conforms to their shapes fixing the items in the exact location that they are left.

DRAWINGS

Other objects and advantages of the invention will become more apparent upon perusal of the detailed description thereof and upon inspection of the drawings, in which:

FIG. 1 is a front perspective view of a pull-out desk unit for a mobile vehicle with the desk area partially exposed and the cabinet door open made in accordance with this invention.

FIG. 2 is a perspective view of the pull-out desk unit shown in FIG. 1 with the desk area in transition to a stowed general area mode.

FIG. 3 is a front perspective view of a pull-out desk unit of FIG. 2 with the desk area fully exposed and the cabinet door open.

FIG. 5 is a side view of the pull-out desk unit of FIG. 2.

DESCRIPTION OF INVENTION

Figure 6:
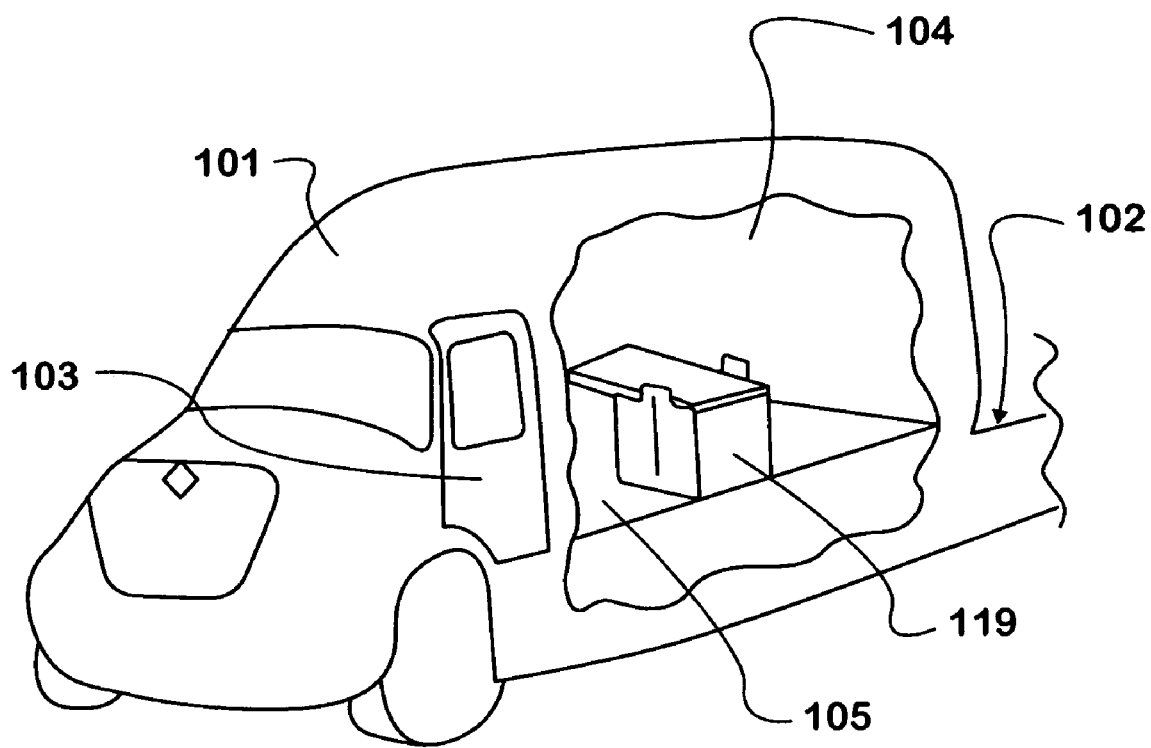
FIG. 6 is a perspective of a mobile vehicle with the pull-out desk of FIG. 2 installed.

A motor vehicle 101, specifically a tractor trailer, includes a cab 103 engaged to a drive train bearing chassis 102. For over the road tractors, there will be a sleeper compartment 104 that includes driver living space. The sleeper compartment 104 includes a mounting floor 105 as well as the off duty living space for the driver or drivers. The vehicle 101 shown in FIG. 6 has a pull-out desk unit 119 made in accordance with the invention resting on the mounting floor and mounted within the sleeper compartment 104.

Figure 4:
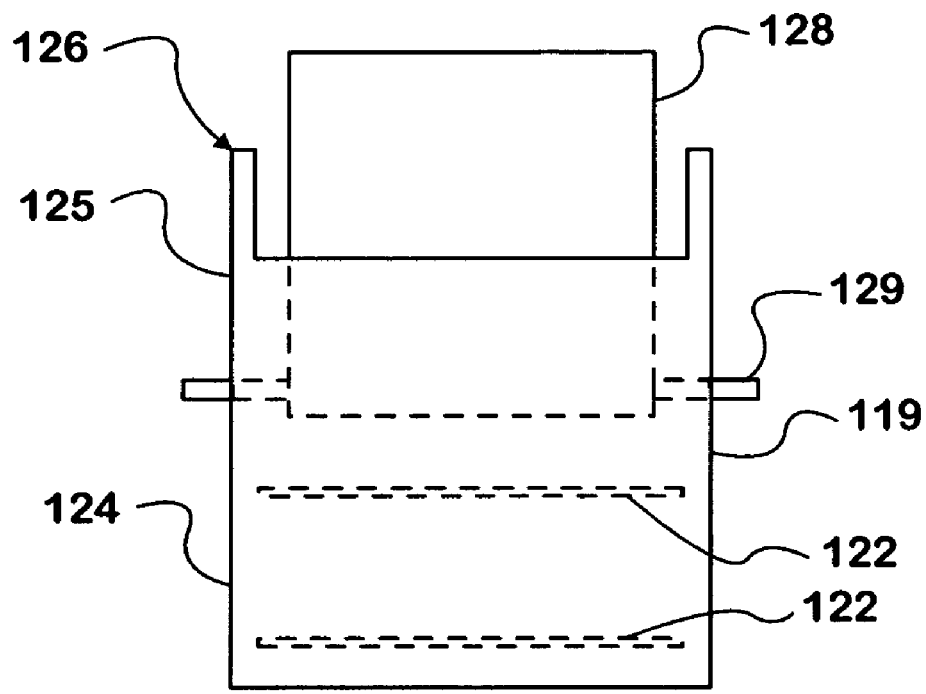
FIG. 4 is a front view of the pull-out desk unit of FIG. 2.
Figure 7:
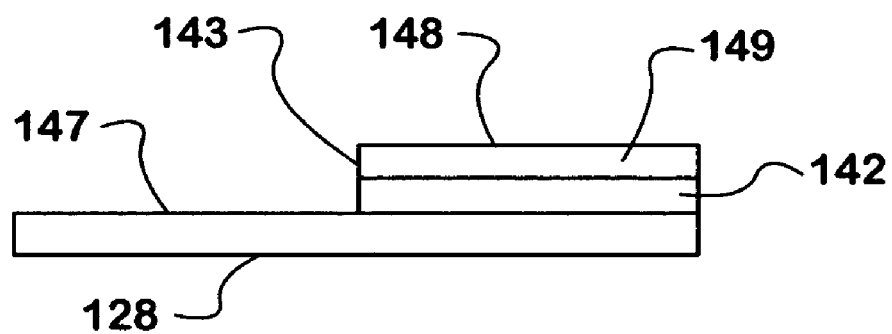
FIG. 7 is a side view of the cantilevered dual surface table of the pull-out desk unit of FIG. 2.

The pull-out desk unit 119 is shown in FIGS. 1 to 5. The pull-out desk unit has a cabinet structure 121 that may include shelves 122 and a hinged door 123 to access the storage area within. Each of the sides 125 of the cabinet structure 121 contain a slot or runner 124. The sides 125 may have extensions 126 to allow the slot or runner 124 to extend above the upper edges 127 of the cabinet structure 121. There is a cantilevered dual surface table 128 that contains low friction rider 129 that rides along the slot or runner 124 when the cantilevered dual surface table 128 is being unstowed or stowed in a stowage area 130 of the cabinet structure 121. The friction runners 129 will be at the upper limit of the slot or runner 124 when the cantilevered dual surface table 128 is in the unstowed general use position. The weight of the cantilevered dual surface table 128 acts to hold or torque the friction runners 129 at the upper limit of the slot or runners 124. The cantilevered dual surface table 128, as shown in FIGS. 1, 3, and 7 has lower base frame 141 with a foldable lid 142. When folded closed, the outer surface of the foldable lid 142 provides and eating or general work table. The foldable lid 142 has a hinged surface 143 that allows the foldable lid 142 to be opened. The movable portion 148 of the foldable lid 142 contains memory foam 149. This memory foam can be locally compressed to hold office items 161 and 162 such as pens, paper, or PDAs in place on the writing surface 147.

The cantilevered dual surface table 128 offers truckers a legless table for eating and general tasks, as well as desk area that keeps their belongings as they leave them eliminating the need to clean up or put things away. The innovation in this product lies in the memory foam lid 148. Once the table 128 is pulled out, the lid 142 (top surface for eating/general table) can be unlatched and fold back revealing a desk area (2 inches lower in a preferred embodiment). On the under side of the lid 142 is 2 inch low density memory foam 149 in a preferred embodiment. This foam can compress easily to $1/16^{th}$ inch allowing it to conform to anything left on the table 147 that is less than 1.75 inches thick. Clerical supplies, small laptops, PDA's and other items 161 and 162 can be left on the desk surface 147 and when the memory foam lid 142 is latched closed, the memory foam 149 conforms to the office items 161 and 162 shapes fixing the items in the exact location that they are left on the writing surface 147.

In one embodiment, the entire table unit 128 stores vertically within a 12 inch deep unit on the drivers side wall of the vehicle 101. The table 128 occupies the back 6 inches of this unit leaving the front 6 inches for storage of small items. The prototype utilizes this space for a storage resembling a bathroom medicine cabinet.

As described above, the pull-out desk unit of this invention and vehicle made with the unit installed provide a number of advantages, some of which have been described above and others of which are inherent in the invention. Also modifications may be proposed to the pull-out desk unit of this invention and vehicle made with the unit installed of this invention without departing from the teachings herein.

We claim:

1. A mobile vehicle in combination with a pull-out desk unit, comprising:
   a cab engaged to a drive train bearing chassis;
   a sleeper compartment including driver living space;
   said sleeper compartment including a mounting floor;
   a pull-out desk unit engaged to said mounting floor;
   said pull-out desk unit having a cabinet structure for engagement to the mounting floor;
   said cabinet structure having two sides, each of said sides containing a slot or runner;
   said sides of said cabinet structure having extensions to allow said slot or runners to extend above upper edges of said cabinet structure;
   a cantilevered dual surface table that containing low friction riders that rides along said slot or runners when said cantilevered dual surface table is being unstowed or stowed in a stowage area of said cabinet structured;
   said cantilevered dual surface table having a lower base frame with a foldable lid;
   an outer surface of said foldable lid provides and eating or general work table when said foldable lid is closed;
   said foldable lid having a hinged surface that allows said foldable lid to be opened;
   a movable portion of said foldable lid containing memory foam; and
   said memory foam capable of local compressed to hold office items in place on a writing surface contained on said lower base frame of said cantilevered dual surface table.

2. The mobile vehicle combination of claim 1, wherein:
   Said cabinet structure including shelves and a hinged door to access the storage area within.

3. The mobile vehicle combination of claim 2, wherein:
   said friction runners being at the upper limit of said slot or runners when said cantilevered dual surface table is in the unstowed general use position, the weight of said cantilevered dual surface table acting to hold said friction runners at an upper limit of said slot or runners.

* * * * *